United States Patent [19]

Lemp

[11] Patent Number: 4,836,246
[45] Date of Patent: Jun. 6, 1989

[54] MANIFOLD FOR DISTRIBUTING A FLUID AND METHOD FOR MAKING SAME

[75] Inventor: Mark D. Lemp, Sterling Heights, Mich.

[73] Assignee: Colt Industries Inc., New York, N.Y.

[21] Appl. No.: 80,990

[22] Filed: Aug. 3, 1987

[51] Int. Cl.⁴ .............................................. F23K 5/00
[52] U.S. Cl. ............................................... 137/561 A
[58] Field of Search ....................... 137/561 R, 562 A

[56] References Cited

U.S. PATENT DOCUMENTS

| | | | |
|---|---|---|---|
| 3,360,008 | 12/1967 | Papale et al. ................ | 137/561 R X |
| 3,760,842 | 9/1973 | Mikiya ......................... | 137/561 R X |
| 3,799,196 | 3/1974 | Scheitlin et al. ............... | 137/561 A |
| 4,369,640 | 1/1983 | Fox ............................... | 137/561 A X |

FOREIGN PATENT DOCUMENTS 884865 12/1961 United Kingdom ........... 137/561 A

*Primary Examiner*—John Rivell
*Attorney, Agent, or Firm*—Walter Potoroka, Sr.

[57] ABSTRACT

A manifold for distributing a fluid to a plurality of fluid ports, and a method for manufacturing the manifold. The manifold comprises a first tubular means forming a first tube, a second tubular means forming a second tube extending axially outwardly beyond said first tubular means, support means connected to one end of said first tubular means for supporting said second tubular means in spaced relationship to said first tubular means, and housing means molded about said first and second tubular means for forming an integral manifold.

34 Claims, 4 Drawing Sheets

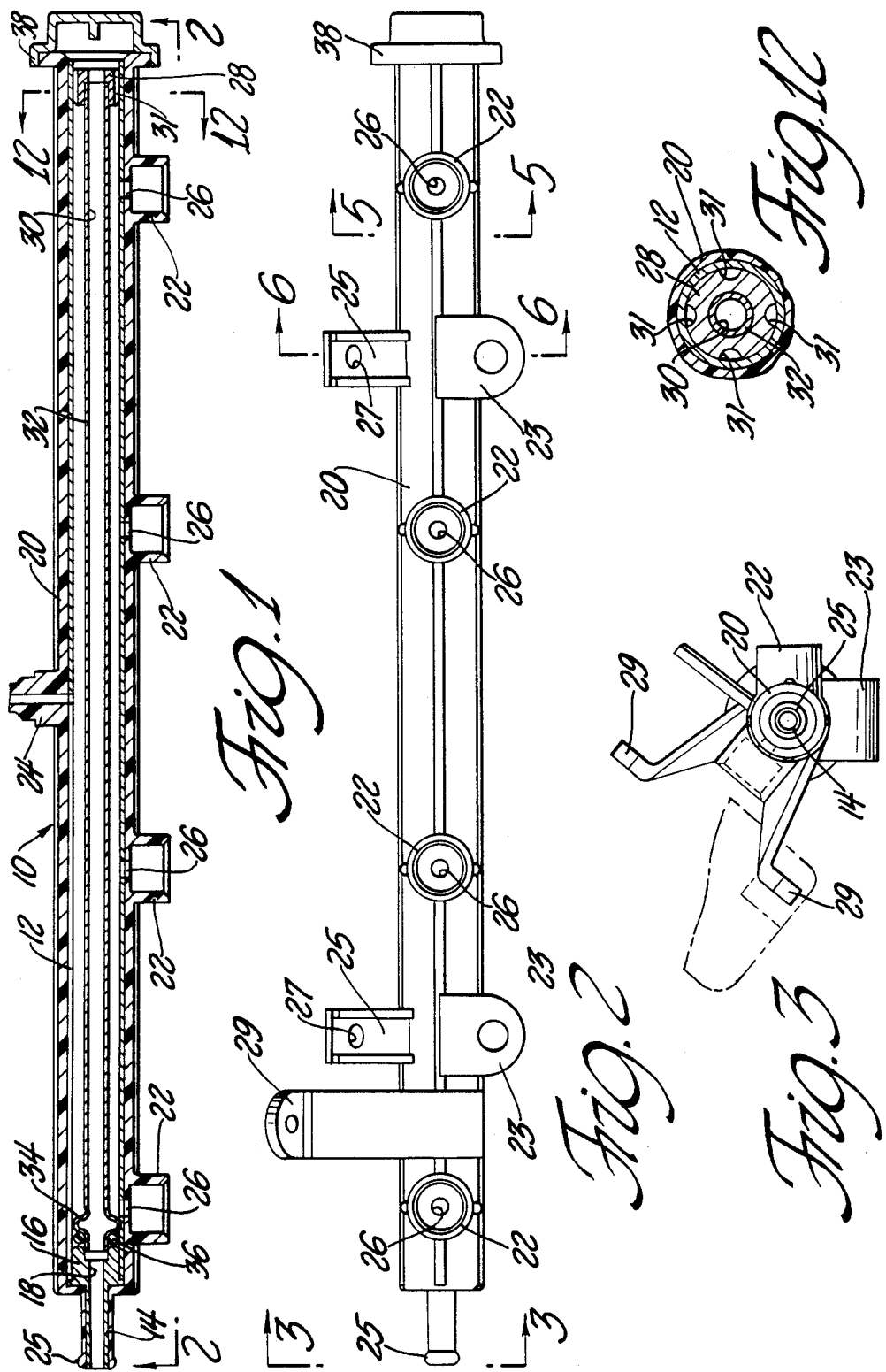

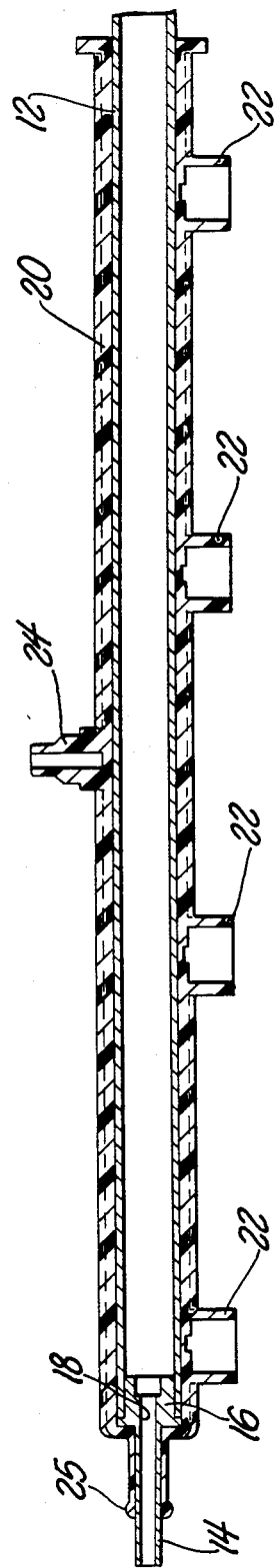

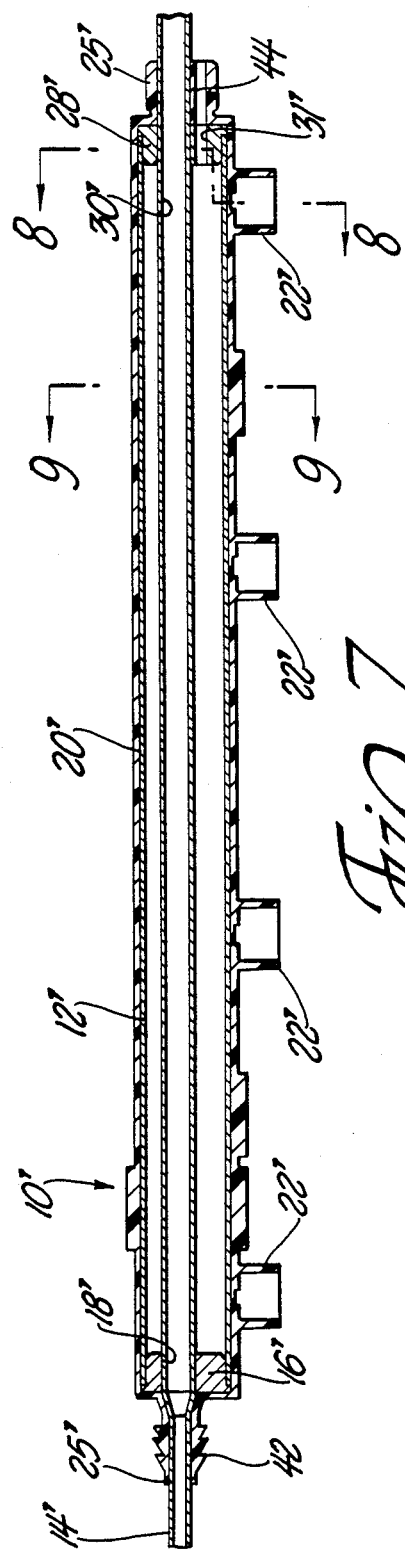
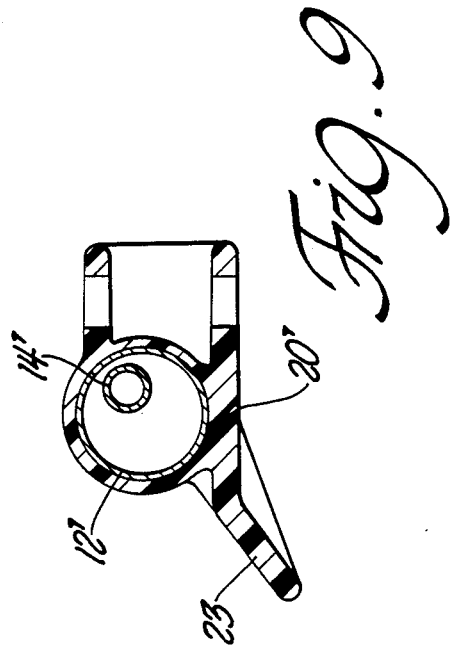
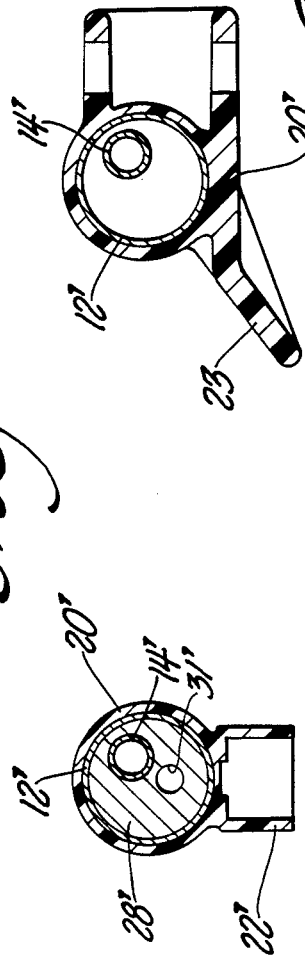

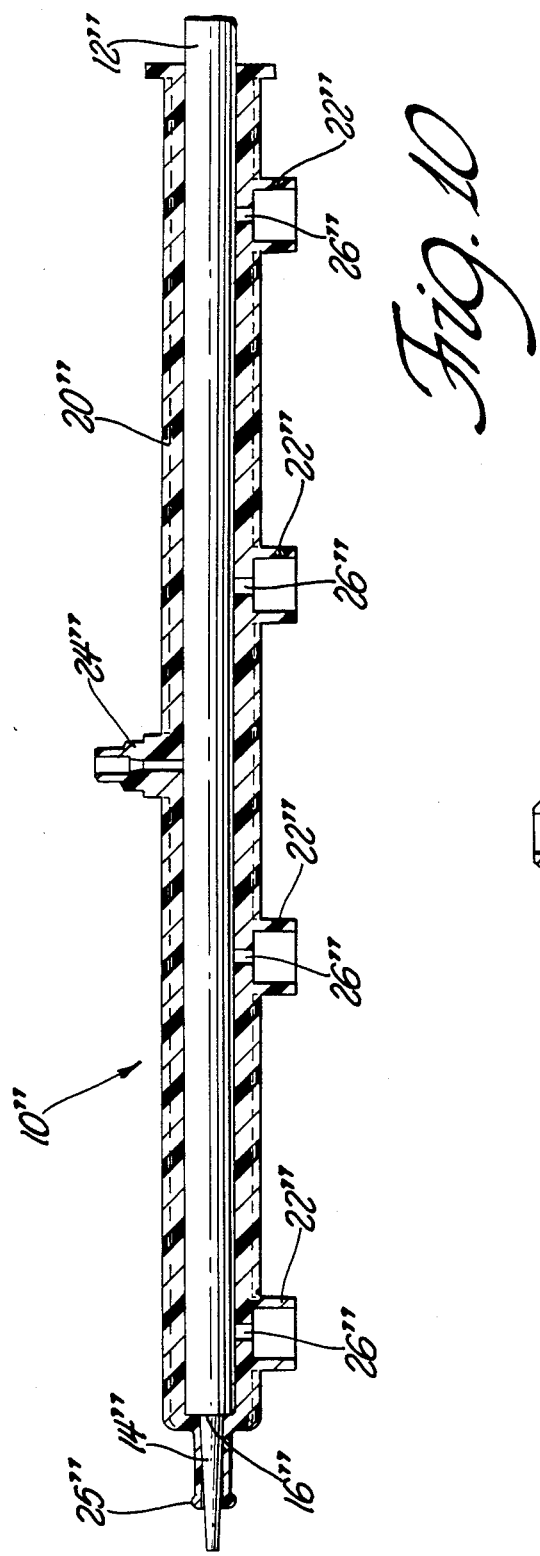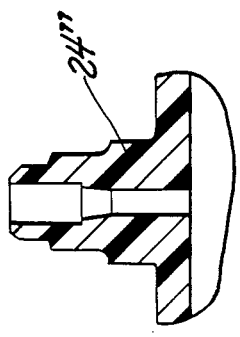

4,836,246

MANIFOLD FOR DISTRIBUTING A FLUID AND METHOD FOR MAKING SAME

TECHNICAL FIELD

The subject invention relates to a manifold for distributing a fluid to a plurality of fluid ports, and particularly, a fuel rail for distributing fuel to a plurality of fuel injectors in an engine.

BACKGROUND ART

Manifolds for distributing fuel to a plurality of fuel injectors have been used in the past. Typically, a fuel rail or manifold comprises a longitudinal tube and a plurality of fuel cups spaced longitudinally therealong. The manifold also includes several bracket members for connecting the manifold to an engine.

The problem with such manifolds is that the longitudinal tube, fuel cups and brackets are separate members. This requires each part to be individually machined to the proper dimensions and then assembled in a fixture. Brazing is used to secure all the part together as an integral unit. This requires a large amount of time and is very costly to produce.

STATEMENT OF THE INVENTION AND ADVANTAGES

A manifold for distributing a fluid to a plurality of fluid ports includes a first tubular means forming a first tube. A second tubular means forms a second tube extending axially outwardly beyond said first tubular means. A support means connected to one end of the first tubular means supports the second tubular means in spaced relationship to the first tubular means. A housing means is molded about the first and second tubular means for forming an integral manifold.

Accordingly, a method for making a manifold for distributing fluid to a plurality of fluid ports includes the steps of forming a first tube. The steps include forming a second tube to extend axially beyond the first tube. The second tube is supported in spaced relationship to the first tube by an end plug connected to one end of the first tube. The ends of the tubes are secured in a die and the material is injected into the die. An integral housing is formed about the tubes and has at least one fluid port connection for attachment to fluid port and bracket support members to allow attachment to a support surface.

The subject invention forms the longitudinal housing including the fuel cups and support brackets as an integral manifold. This saves time and is less costly than forming individual parts and brazing them together.

FIGURES IN THE DRAWINGS

Other advantages of the present invention will be readily appreciated as the same becomes better understood by reference to the following detailed description when considered in conjunction with the accompanying drawings wherein:

FIG. 1 is a sectional elevational view of one embodiment of the subject invention;

FIG. 2 is a bottom view of the subject invention, taken along the plane of line 2—2 of FIG. 1, looking in the direction of the arrows;

FIG. 3 is an elevational view taken along lines 3—3 of FIG. 2, looking in the direction of the arrows;

FIG. 4 is a sectional elevational view of the preferred embodiment of the subject invention;

FIG. 5 is a sectional view of the subject invention taken along lines 5—5 of FIG. 2, looking in the direction of the arrows;

FIG. 6 is a sectional view taken along lines 6—6 of FIG. 2, looking in the direction of the arrows;

FIG. 7 is a sectional elevational view of a first alternate embodiment of the subject invention;

FIG. 8 is a sectional view of the first alternate embodiment taken along lines 8—8 of FIG. 7, looking in the direction of the arrows;

FIG. 9 is a sectional view of the alternate first embodiment taken along lines 9—9 of FIG. 7;

FIG. 10 is a sectional view of a second alternate embodiment of the subject invention;

FIG. 11 is an enlarged fragmentary sectional view of the valve boss of FIG. 10; and FIG. 12 is a sectional view taken along lines 12—12 of FIG. 1, looking in the direction of the arrows.

DETAILED DESCRIPTION OF THE DRAWINGS

A fuel rail or manifold for distributing a fuel or fluid to a plurality of fuel cups or ports is generally shown at 10 in FIG. 1. The manifold 10 includes a first tubular means 12 comprising a first longitudinal tube 12 having an open end at each end thereof. The manifold 10 includes a second tubular means 14 comprising a second longitudinal tube 14 extending axially outwardly beyond the first tubular means 12. The manifold 10 further includes a support means 16 connected to one end of the first tubular means 12 for supporting the second tubular means 14 in spaced relationship to the first tubular means 12. The support means 16 comprises a first end plug 16 disposed in one end of the first tube 12 and having a first aperture 18 communicating axially therethrough. One end of the second tube 14 is connected to or may be formed integrally with one end of the first end plug 16.

The manifold 10 includes a housing means 20 comprising a polymer material molded about the first 12 and second 14 tubular means for forming an integral housing 20 about the tubular means 12, 14 to form an integral manifold 10. The housing 20 includes at least one, and preferably a plurality of longitudinally spaced, fluid cup or port connections 22 integrally formed with and along the housing means 20 for attachment to a fuel injector of fluid port (not shown). As illustrated in FIGS. 2, 3 and 6, the housing means 20 also includes bracket support members 23 formed integrally with the housing means 20 to allow attachment to a support surface. The housing 20 also includes pressure regulator mounting brackets 29 to allow attachment of a pressure regulator to the housing 20. The housing means 20 further includes a pressure valve boss 24 formed integrally with the housing 20 and having a configuration similar to a nipple which may be threaded. The housing means 20 also includes an end connection 25 integrally formed with the housing means 20 about the second tubular means 14. The end connection 25 may have a plurality of barbs or be threaded. The housing means 20 includes wire support members 25 having an aperture 27 to allow injector wires (not shown) to be secured to support members 25.

The manifold 10 also includes an aperture means 26 forming at least one second aperture 26 in the fluid port connection 22 and communicating with the housing means 20 and the first tubular means 12 to allow fluid to flow from the first tubular means 12 to the fluid port connection 22. The manifold 10 further includes a second end plug or spacer 28 disposed in the other end of the first tube 12 and having a third aperture 30 communicating therethrough. As illustrated in FIG. 12, the second end plug 28 includes a plurality of grooves 31 in the outer periphery thereof to allow fuel to pass from the second tubular means 14 to the first tubular means 12. A third tube 32 communicates with the second tube 14 and has an annular ridge 34 formed therein and spaced axially from one end thereof. The third tube 32 is disposed within the first tube 12 and has one end communicating with the second tube 14 and the other end communicating with the second end plug 28. The end plugs 16, 28 have one end disposed about the third tube 32 and within the first tube 12 to space the third tube 32 within the first tube 12. A sealing member such as an O-ring 36 is disposed about the third tube 32 and axially between the ridge 34 and the first end plug 16. The manifold 10 includes an end cap 38 connected to one end of the housing means 20 to form a closed end thereof. The third tube 32, O-ring 36 and second end plug 28, which may be inserted into the first tubular means 12 prior to attaching end cap 38, is an optional structure that provides optimum performance. Thus, the manifold 10 may be adapted to a variety of internal structures.

In operation, fluid such as fuel enters the manifold 10 through the second tubular means 14. Fuel flows from the second tubular means 14 and through the third tube 32 to the end cap 38. Fuel exits the end cap 38 through grooves 31 in the second end plug 28 and into the first tubular means 12. Fuel then flows from the first tubular means 12 through apertures 26 and into the fuel cup connections 22.

A first alternative embodiment of the subject invention wherein like parts are identified by like numerals having a prime numeral is generally shown at 10' in FIG. 7. The manifold 10' includes the second tubular means 14' comprising a second tube 14' disposed within the first aperture 18' of the first end plug 16' and extending along the entire length of the first tube 12' in spaced relationship thereto and axially outwardly beyond both ends of the first tube 12'. The second tubular means 14' may be concentric or eccentric with the first tubular means 12' as illustrated in FIGS. 8 and 9. The housing means 20' includes an end connection 25' integrally formed with the housing means 20' at each end thereof about the second tube 14'. One of the end connections 25' may have barbs 42 integrally formed thereabout. The other end connection 25' may be threaded 44.

A second alternate embodiment of the subject invention wherein like parts are identified by like numerals having a double prime numeral is generally shown at 10" in FIGS. 10 and 11. The manifold 10" is made entirely out of plastic. In other words, a core insert 12", 14", 16" is pulled out of the housing means 20" after molding, thereby eliminating the first and second tubular means and first end plug. However, metal inserts (not shown) may be inserted within the housing means 20" if necessary to strengthen the manifold 10".

Accordingly, the subject invention includes a method for making a manifold for distributing a fluid to a plurality of fluid ports including the steps of forming a first tube 12. The steps include forming a second tube 14 to extend axially beyond the first tube 12. The steps include supporting the second tube 14 in spaced relationship to the first tube 12 by a first end plug 16 connected to one end of the first tube 12.

The step of supporting includes pressing a first end plug 16 about one end of the second tube 14. The steps include pressing the first tube 12 about the first end plug 16 so that one end of the first tube 12 is substantially flush with a flange on the first end plug 16. The steps further include securing the ends of the tubes 12, 14 in a die at approximately 0.625 inches at each end thereof and injecting a material into the die such as between two mold halves for conventional injection molding. The steps further include forming an integral housing 20 about the tubes 12, 14 having at least one fluid port connection 22 for attachment to a fluid port, wire support members 25 to support injector wires and bracket support members 23 to allow attachment of the manifold 10 to a support surface as illustrated in FIGS. 4 through 6. The steps include spacing the second tube 14 concentric or eccentric with the first tube 12 by the end plugs 16, 28.

The method includes the steps of cutting off the ends of the tubes 12, 14 flush with the housing 20 at each end thereof. The steps also include machining an aperture 26 in the fluid port connection 22 to communicate with the first tube 12 to allow fluid to flow from the first tube 12 to the fluid port connection 22, which is formed to a predetermined diameter or size by molding or machining. The steps also include machining the internal diameter of an aperture in the pressure valve boss 24 to a predetermined diameter and to communicate with the first tube 12. The steps further include machining a configuration 42, 44 on either end of the housing 20.

The steps also include forming the housing 20 of a suitable thermoplastic or thermoset material. The steps include inserting internal parts 28, 32, 36 into the first tube 12 through the open end thereof. The steps include sonic or electromagnetically welding an end cap 38 about the open end of the housing 20.

As illustrated in FIGS. 7 through 9, a first alternate method of making the first alternate embodiment 10' of the subject invention includes the steps of forming the second tube 14' to extend along the entire length and axially beyond both ends of the first tube 12' in spaced relationship thereto by a first end plug 16'. The steps also include inserting a second end plug 28' about the second tube 14' and within the first tube 12' at the other end thereof before inserting the tubes 12', 14' in the die. The remaining machining steps are similar to those of the method of the preferred embodiment 10.

A second alternate method of making the second alternate embodiment 10" of the subject invention as illustrated in FIG. 10 and 11 includes the steps of forming the first 12" and second 14" tubes and first end plug 16" as an integral unit such as a core insert. The tubes 12", 14", 16" have a taper along the length thereof. The one-piece core insert 12", 14", 16" is inserted and secured at both ends in the die. The housing 20" is molded or formed about the core insert 12", 14", 16". After the housing 20" is formed or molded, the core insert 12", 14", 16" is pulled from one end and removed from the housing 20". Thus, an all plastic manifold 10" is formed without inner metal tubes. The remaining machining steps are similar to those of the method of the preferred embodiment 10.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A manifold for distributing a fluid to a plurality of fluid ports, said assembly comprising:
   a first tubular means forming a first tube comprising a first tube;
   a second tubular means forming a second tube extending axially outwardly beyond said first tubular means;
   support means connected to one end of said first tubular means for supporting said second tubular means in spaced relationship to said first tubular means;
   housing means molded about said first and second tubular means for forming an integral manifold, said housing means including at least one fluid port connection integrally formed with and along said housing means for attachment to a fluid port and an aperture means forming at least one aperture in said fluid port connection and communicating with said housing means and said first tubular means to allow fluid to flow from said first tubular means to said fluid port connection, bracket supply members formed integrally with said housing means to allow attachment to a support surface, said support means comprising a first end plug disposed in one end of said first tube and having a first aperture communicating axially therethrough.

2. A manifold as set forth in claim 1 characterized by said second tubular means comprising a second tube disposed within said first aperture of said first end plug and extending along the entire length and axially beyond the other end of said first tube in spaced relationship thereto.

3. A manifold as set forth in claim 2 characterized by said support means including a second end plug disposed in the other end of said first tube and having a second aperture communicating therethrough, said second tube being disposed in said second aperture.

4. A manifold as set forth in claim 3 including an end connection integrally formed with said housing means at each end thereof.

5. A manifold as set forth in claim 4 characterized by one of said end connections having barbs integrally formed thereabout.

6. A manifold as set forth in claim 5 characterized by the other of said end connections being threaded.

7. A manifold as set forth in claim 1 characterized by said second tubular means comprising a second tube having one end connected to said support means.

8. A manifold as set forth in claim 7 characterized by said support means comprising a first end plug having a continuous passage communicating axially therethrough to said end of said second tubular means.

9. A manifold as set forth in claim 8 including an end cap connected to one end of said housing means to form a closed end thereof.

10. A manifold as set forth in claim 9 including a pressure valve boss formed integrally with said housing means.

11. A manifold as set forth in claim 10 characterized by said first and second tubes and said support means being formed as an integral unit.

12. A manifold as set forth in claim 10 or 11 characterized by said housing means comprising a polymer material.

13. A manifold for distributing a fluid to a plurality of fluid ports, said assembly comprising;
    a first tubular means forming a first tube having an open end at each end thereof, a second tubular means forming a second tube extending axially outwardly beyond said first tubular means, support means connected to one end of said first tubular means for supporting said second tubular means in spaced relationship to said first tubular means, housing means molded about said first and second tubular means for forming an integral manifold, at least one fluid port connection integrally formed with and along said housing means for attachment to a fluid port, aperture means forming at least one aperture in said fluid port connection and communicating with said housing means and said first tubular means to allow fluid to flow from said first tubular means to said fluid port connection, bracket support members formed integrally with said housing means to allow attachment to a support surface, said first tubular means comprising a first tube, said support means comprising a first end plug disposed in one end of said first tube and having a first aperture communicating axially therethrough, said second tubular means comprising a second tube disposed within said first aperture of said first end plug and extending along the entire length and axially beyond the other end of said first tube in spaced relationship thereto, said support means including a second end plug disposed in the other end of said first tube and having a second aperture communicating therethrough, and including an end connection integrally formed with said housing means at each end thereof, one of said end connections having barbs integrally formed thereabout and the other said end connection being threaded.

14. A manifold for distributing a fluid to a plurality of fluid ports, said assembly comprising;
    a first tubular means forming a first tube having an open end at each end thereof, a second tubular means forming a second tube extending axially outwardly beyond said first tubular means, support means connected to one end of said first tubular means for supporting said second tubular means in spaced relationship to said first tubular means, housing means molded about said first and second tubular means for forming an integral manifold, at least one fluid port connection integrally formed with and along said housing means for attachment to a fluid port, aperture means forming at least one aperture in said fluid port connection and communicating with the said housing means and said first tubular means to allow fluid to flow from said first tubular means to said fluid port connection, bracket support members formed integrally with said housing means to allow attachment to a support surface, said first tubular means comprising a first tube, said second tubular means comprising a second tube having one end connected to said support means, said support means comprising an end plug having a continuous passage communicating axially therethrough to said end of said second tubular means, an end cap connected to one end of said housing means to form a closed end thereof, a pressure valve boss formed integrally with said housing means, and said housing means comprising a polymer material.

15. A method for making a manifold for distributing fluid to a plurality of fluid ports, said method comprising the steps of:
   forming a first tube;
   forming a second tube to extend axially beyond the first tube;
   supporting the second tube in spaced relationship to the first tube by an end plug connected to one end of the first tube;
   securing the ends of the tubes in a die; and
   injecting a material into the die and forming an integral housing about the tubes having at least one fluid port connection for attachment to a fluid port and bracket support members to allow attachment to a support surface.

16. A method as set forth in claim 15 including the step of cutting off the ends of the tubes flush with the housing at each end thereof.

17. A method as set forth in claim 16 including the step of machining an aperture in the fluid port connection to communicate with the first tube to allow fluid to flow from the first tube to the fluid port connection.

18. A method as set forth in claim 17 including the step of forming the fluid port connection of the housing to a predetermined diameter.

19. A method as set forth in claim 18 characterized by the step of forming the housing of a polymer material.

20. A method as set forth in claim 19 including the step of machining a configuration on either end of the housing.

21. A method as set forth in claim 20 including the step of inserting internal parts into the first tube through the open end thereof.

22. A method as set forth in claim 21 including the step of welding an end cap about the open end of the housing.

23. A method as set forth in claim 15 including the step of spacing the second tube concentric with the first tube.

24. A method as set forth in claim 15 including the step of spacing the second tube eccentric with the first tube.

25. A method as set forth in claim 15 including the step of forming the second tube to extend along the entire length and axially beyond the other end of the first tube in spaced relationship thereto.

26. A method as set forth in claim 25 including the step of pressing an end plug about one end of the second tube.

27. A method as set forth in claim 26 including the step of pressing the first tube about the first end plug so that one end of the first tube is substantially flush with a flange on the end plug.

28. A method as set forth in claim 27 including the step of inserting a second end plug about the second tube and within the first tube at the other end thereof.

29. A method as set forth in claim 9 including the step of removing the first and second tubes and end plug after the housing is molded.

30. A method as set forth in claim 29 further characterized by forming the first and second tubes and end plug as an integral unit.

31. A method as set forth in claim 30 further characterized by forming a taper on the first and second tubes.

32. A method for making a manifold for distributing a fluid to a plurality of fluid ports, said method comprising the steps of;
   forming a first tube having an open end at each end thereof, forming a second tube to extend axially beyond the first tube, supporting the second tube in spaced relationship to the first tube by a first end plug connected to one end of the first tube, securing the ends of the tubes in a die, injecting a material into the die and forming an integral housing about the tubes having at least one fluid port connection for attachment to a fluid port and bracket support members to allow attachment to a support surface, machining an aperture in the fluid port connection to communicate with the housing and first tube to allow fluid to flow from the first tube to the fluid port connection, cutting off the ends of the tubes flush with the housing at each end thereof, forming the fluid port connection of the housing to a predetermined diameter, machining a configuration on either end of the housing, spacing the second tube with respect to the first tube, forming the second tube to extend along the entire length and axially beyond the other end of the first tube in spaced relationship thereto, pressing an end plug about one end of the second tube, pressing the first tube about the end plug so that one end of the first tube is substantially flush with the flange on the end plug, inserting a second end plug about the second tube and within the first tube at the other end thereof, and machining a configuration in the pressure valve boss to a predetermined diameter.

33. A method for making a manifold for distributing a fluid to a plurality of fluid ports, said method comprising the steps of;
   forming a first tube having an open end at each end thereof, forming a second tube to extend axially beyond the first tube, supporting the second tube in spaced relationship to the first tube by a first end plug connected to one end of the first tube, securing the ends of the tubes in a die, injecting a material into the die and forming a one-piece integral housing about the tubes having at least one fluid port connection for attachment to a fluid port and bracket support members to allow attachment to a support surface, machining an aperture in the fluid port connection to communicate with the housing and first tube to allow fluid to flow from the first tube to the fluid port connection, cutting off the ends of the tubes flush with the housing at each end thereof, forming the fluid port connection of the housing to a predetermined diameter, forming the housing of a polymer material, inserting internal parts into the first tube through the open end thereof, and welding an end cap about the open end of the housing.

34. A method for making a manifold for distributing a fluid to a plurality of fluid ports, said method comprising the steps of:
   forming a first tube having an end plug at one end thereof and a second tube to extend axially beyond the first tube as an integral unit; forming a taper on the first and second tubes;
   securing the ends of the tubes in a die;
   injecting a material into the die and forming an integral housing about the tubes having at least one fluid port connection for attachment to a fluid port and bracket support members to allow attachment to a support surface;
   removing the first and second tubes and end plug from the housing after the housing is molded; and
   machining an aperture in the fluid port connection to communicate with the housing to allow fluid to flow from within the housing to the fluid port connection.

* * * * *